United States Patent [19]

Tamura et al.

[11] Patent Number: 4,692,793

[45] Date of Patent: Sep. 8, 1987

[54] CIRCUIT FOR BLANKING THE VIDEO OF A TELEVISION SET FOR A TIME AFTER TURN-ON

[75] Inventors: Takahiko Tamura, Tokyo; Yoshinari Sengoku, Kanagawa, both of Japan

[73] Assignee: Sony Corporation, Tokyo, Japan

[21] Appl. No.: 826,025

[22] Filed: Feb. 4, 1986

[30] Foreign Application Priority Data

Feb. 14, 1985 [JP] Japan .................................. 60-27420

[51] Int. Cl.⁴ ......................... H04N 9/73; H04N 9/16
[52] U.S. Cl. ........................................ 358/29; 358/74
[58] Field of Search ..................................... 358/29, 74

[56] References Cited

U.S. PATENT DOCUMENTS 4,356,508 10/1982 Okada .................................... 358/29
4,450,476 5/1984 Tallant .................................. 358/74
4,587,566 5/1986 Hinn ...................................... 358/29

FOREIGN PATENT DOCUMENTS 18086 1/1985 Japan .

Primary Examiner—John W. Shepperd

Attorney, Agent, or Firm—Hill, Van Santen, Steadman & Simpson

[57] ABSTRACT

A color picture tube for displaying a color picture which has a signal supply that includes a plurality of primary color signal channels for supplying a plurality of primary color signals to the color picture tube and current detecting means connected to the signal supply so as to detect currents flowing through the color picture tube and an automatic white balance circuit for controlling the signal supply in response to the detected currents detected by the current detecting means including a power responsive circuit for generating a control signal when a power switch for the television receiver is turned on and a gate pulse generator which blanks except during reference signal insertion connected to the signal supply to inhibit the supply of primary color signals to the picture display means and first circuit means connected to the power responsive circuit to actuate the gate pulse generator when the power switch is turned on and second circuit means connected to the current detecting means for deactuating the gate pulse generator after the current which flows through the display tube exceeds a predetermined value.

5 Claims, 10 Drawing Figures

FIG. 1 (PRIOR ART)

FIG. 4B ($P_{BLK}$) 
FIG. 4C ($P_{G1}$) 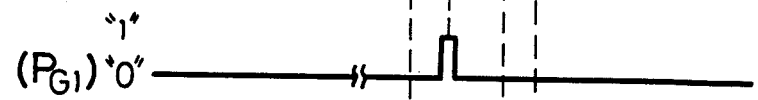
FIG. 4D ($P_{G2}$) 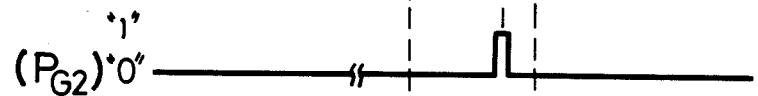
FIG. 4E ($P_G$) 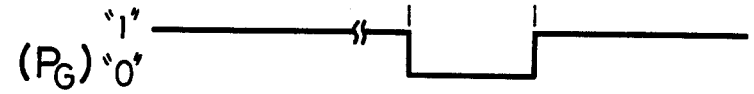

FIG. 5B ($S_C$) 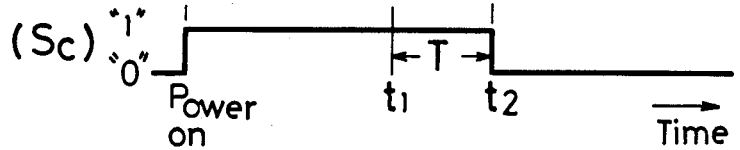

CIRCUIT FOR BLANKING THE VIDEO OF A TELEVISION SET FOR A TIME AFTER TURN-ON

BACKGROUND OF THE INVENTION

1. Field of the Invention

The present invention relates in general to a color television receiver having an automatic white balance adjusting circuit which has video blanking during a predetermined period after a power switch of a television receiver is turned on which prevents an unstable picture due to variations of the automatic white balance adjusting circuit during turn-on.

2. Description of the Prior Art

FIG. 1 is a block circuit diagram showing an example of a prior art television receiver wherein an antenna 1 supplies an input to a tuner circuit 2. A video detector circuit 3 receives an amplified intermediate frequency signal from the tuner 2 and supplies a composite video signal $S_V$ to a luminance signal/chrominance signal separator circuit 4.

A luminance signal Y from the separator circuit 4 is supplied through a luminance amplifier 5 to a matrix circuit 6. Also, a chrominance signal C from the separator circuit 4 is supplied to a color demodulator circuit 7. The color demodulator circuit 7 produces a red color difference signal R-Y and a blue color difference signal B-Y both of which are fed to the matrix circuit 6.

The matrix circuit 6 performs the matrix resolution of the luminance signal Y and the color difference signals R-Y and B-Y and produces red, green and blue primary color signals R, G and B at its output. The red primary color signal R is supplied through an adder 8R to an amplifier 9R and through a level shifter circuit 10R to the base of an npn-type transistor 12R which forms a video output circuit 11R.

The emitter of the transistor 12R is grounded through a resistor 13R and the collector of transistor 12R is connected through a resistor 14R to a power supply terminal +B. The collector of the transistor 12R is also connected to the base of a pnp-type transistor 15R. The emitter of the transistor 15R is connected to a cathode $K_R$ that provides the red color gun of a color picture tube 16 and the collector of transistor 15R is grounded through a transistor 17R.

It is also to be realized that the green primary color signal G and the blue primary color signal B supplied from the matrix circuit 6 are also supplied to adders 8G and 8B, respectively. Although not illustrated, circuit elements are mounted between the adders 8G and 8B which correspond to those in the red primary color signal and are respectively connected to the green cathode $K_G$ and the blue cathode $K_B$ of the tube 16. Since these circuits are identical to the red channel, they are not shown in detail in FIG. 1.

The luminance signal Y obtained from the separator circuit 4 is supplied to a sync separator circuit 18. A horizontal sync signal $P_H$ and a vertical sync signal $P_V$ obtained from the sync separator circuit 18 are supplied to a horizontal deflection circuit 19H and a vertical deflection circuit 19V, respectively. The respective deflection signals from horizontal deflection circuit 19H and the vertical deflection circuit 19V are fed to a deflection coil 20 of the picture tube 16.

In the circuit arrangement described above, the cathodes $K_R$, $K_G$, and $K_B$ of the picture tube 16 are driven by the red, green and blue primary colors R, G and B and a color picture will be displayed on the video screen of the picture tube 16.

A blanking pulse generator circuit 21 for generating a horizontal blanking pulse and also a vertical blanking pulse of 5–6 horizontal periods receives inputs as shown. The blanking pulse generator 21 is supplied with a pulse signal $P_H'$ of the horizontal period from the horizontal deflection circuit 19H and also a signal $P_V'$ of the vertical period from the vertical deflection circuit 19V and npn-type transistor 22R receives on its base a signal $P_{BLA}$ from the blanking pulse generator 21. Thus, during the period of the blanking pulse $P_{BLK}$, the transistor 22R will be turned on so that the base of the transistor 12R to which it is connected will be grounded to cause video blanking and, thus, a flyback line is prevented from appearing on the video screen. Although not illustrated such video blanking is accomplished in the same way with respect to the green primary color signal path and the blue primary color signal path.

A pulse generator circuit 23 generates a reference pulse $P_{REF}$ that is used to adjust the white balance. The pulse generator circuit 23 is supplied with signals $P_H'$ and $P_V'$ from the deflection circuits 19H and 19D. The reference pulse signal $P_{REF}$ is formed such that its first half during one horizontal period is composed of a signal $P_1$ having a luminance level of 60 IRE which is used to adjust the beam current of the white level and its second half is composed of a signal $P_2$ having a luminance level in a range from 15–20 IRE which is used to adjust the beam current of the black level. The reference pulse $P_{REF}$ is supplied to a reference signal insertion circuit 24 and from its output to adders 8R, 8G and 8B and the reference pulse $P_{REF}$ is inserted into a predetermined horizontal period of each vertical blanking period of the primary color signals R, G and B as illustrated in FIG. 4A. In FIG. 4A, reference letter $H_S$ designates a horizontal sync signal and FIG. 4B shows the blanking pulse $P_{BLK}$.

The connection point between the collector of the transistor 15R and the resistor 17R is connected through a switching circuit 25R to one input terminal of an operational amplifier 26R which comprises a comparator. A gate pulse generator circuit 27 receives the signals $P_H'$ and $P_V'$ deflection circuits 19H and 19V. The gate pulse generator 27 generates a gate pulse $P_{G2}$ illustrated in FIG. 4D which corresponds to the signal $P_2$ position of the reference pulse $P_{REF}$. The gate pulse $P_{G2}$ is supplied to the switching circuit 25R to turn on the switching circuit 25R only during the period of the gate pulse $P_{G2}$. A capacitor illustrated is connected between the output terminal of switching circuit 25R and ground. This capacitor is charged during the pulse period of the gate pulse $P_{G2}$ and the potential of the capacitor will be held during the period in which the switching circuit 25R is turned off. This causes the deflected voltage $E_B$ corresponding to a cathode beam current $I_R$ when the signal $P_2$ is supplied to the cathode $K_R$ to be supplied to one input terminal of the operational amplifier 26R where it is compared with a reference voltage $E_{R2}$ which is supplied to the other input terminal of the amplifier 26R. The error signal produced at the output terminal of the operational amplifier 26R is supplied to the level shifter circuit 10R as a control signal such that a DC level is controlled such that the cathode current $I_R$ has a predetermined black level when the signal $P_2$ occurs which is determined by the reference voltage $E_{R2}$ in consideration of the white balance.

The connection point between the collector of the transistor 15R and the resistor 17R is also connected through a switching circuit 28R to one input terminal of an operational amplifier 29R which forms a comparator. The gate pulse generator circuit 27 also generates a gate pulse $P_{G1}$ illustrated in FIG. 4C which corresponds to the signal $P_1$ portion of the above-mentioned reference pulse $P_{REF}$. The gate pulse $P_{G1}$ is supplied to the switching circuit 28R so that the switching circuit 28R will be turned on only during the pulse period of the gate pulse $P_{G1}$. A capacitor is connected between the output terminal of the switching circuit 28R and ground as illustrated. This capacitor is charged during the pulse period of the gate pulse $P_{G1}$ and the voltage will be held during the period in which the switching circuit 28R is turned off. Accordingly, a detected voltage $E_W$ corresponding to the cathode current $I_R$ when the signal $P_1$ is supplied to the cathode $K_R$ is obtained. The voltage $E_W$ is supplied to one input terminal of the operational amplifier 29R and a reference voltage $E_{R1}$ is supplied to the other input terminal of the operational amplifier 29R. The error signal produced at the output terminal of the operational amplifier 29R is supplied to the amplifier 9R as the control signal so that the gain of the amplifier 9R is controlled such that the cathode current $I_R$ during the signal $P_1$ will have a predetermined white level that is determined by the reference voltage $E_{R1}$ in consideration of the white balance.

Although not illustrated, the control of the cathode beam currents for the green and blue primary color signal systems is accomplished in the same manner as that illustrated for the cathode current for the red electron gun. Thus, in the prior art system of FIG. 1, the white balance will be automatically adjusted.

A white balance adjusting apparatus has been disclosed in published document, Japanese Patent Publication (KOKAI) No. 55-67286 which discloses a system wherein when the power switch of the television receiver is turned on, an automatic control loop is cutoff and a white balance adjusting voltage is supplied from a predetermined bias source and after a predetermined time since the power switch of the television receiver has been turned on, the automatic control loop is operated. However, in this system described in Japanese Patent Publication No. 55-67286 since the picture is already displayed on the picture screen of the television receiver before the AWB loop is stabilized, and when the automatic control loop is changed from an inoperable condition to the operable condition, a transit condition on the picture screen is inevitable so that the display picture becomes unstable similar to the prior art described example above.

SUMMARY OF THE INVENTION

The present invention relates to a color television receiver having an automatic white balance adjusting circuit in which the video blanking signal is carried out during a predetermined period after a power switch of a television receiver is turned on so that when the television receiver is initially powered an unstable picture due to instability of the automatic white balance adjusting circuit will be prevented from appearing on the picture screen of the television receiver.

Accordingly the television receiver of the present invention solves the following problems of the prior art circuit such as illustrated in FIG. 1, for example. In such prior art circuits, when the television receiver with automatic white balance adjusting circuit (AWB circuit) the following problems occur when the power switch of the television receiver is turned on.

1. Since the heater for a cathode electrode of the display tube is not heated when the TV set is turned on, the video circuit is controlled so as to be in a condition to cause the cathode beam current to flow at a maximum value. Thus, when the heater is heated sufficiently and the cathode emission begins, the video screen becomes too bright during a transient time until the AWP circuit system is stabilized.

2. Since the cutoff voltage $E_{KCO}$ of the display tube is scattered between the red color, the green color, and the blue color cathodes, the AWB circuit system will be stabilized after different times for the red color, the green color and the blue color and the color of the picture will not be constant and fluctuates during the time transient and such picture instability causes eye strain or eye pain to the observer. FIG. 5A illustrates an example of variations of the cathode currents for the red, green and blue colors after the power switch of the television receiver has been switched on.

The present invention prevents a picture from being displayed unstably when the power switch of the television receiver is turned on and, thus, eliminates the above described problem of the prior art.

In the present invention so as to solve a problem of the prior art, the present invention accomplishes video blanking until the automatic white balance systems for the red, green and blue colors are stabilized after the power switch of the television receiver is turned on. Specifically, when the power switch of the television receiver is turned on, the video blanking is carried out and after a predetermined time since all of the cathode currents of the picture tube 16 reach a value which is higher than a predetermined value the video blanking is released or is made inoperative.

Since the video blanking is accomplished until the white balance adjusting circuit loop for the red, green and blue color signals are stabilized after the power switch of the television receiver has been turned on, an unstable picture will be prevented from being displayed on the picture screen of the television receiver.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

BRIEF DESCRIPTION OF THE DRAWINGS

FIG. 1 is a block diagram of a prior art automatic white balance adjusting system;

FIGS. 4A through 4E are graphs showing pulses for explaining the invention; and

FIGS. 5A and 5B are graphs useful for explaining the invention.

DESCRIPTION OF THE PREFERRED EMBODIMENTS

Figure 1:
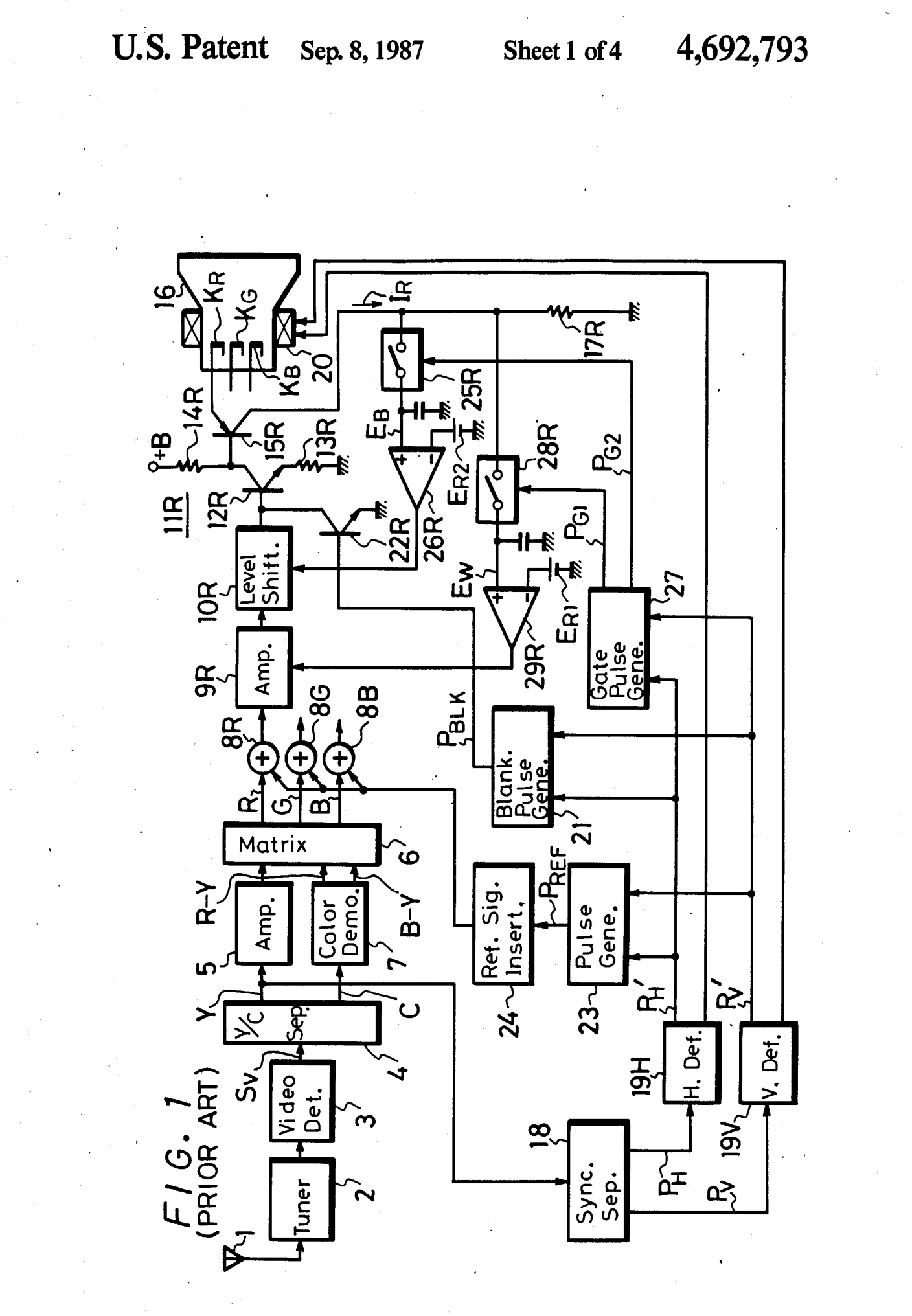
Figure 2:
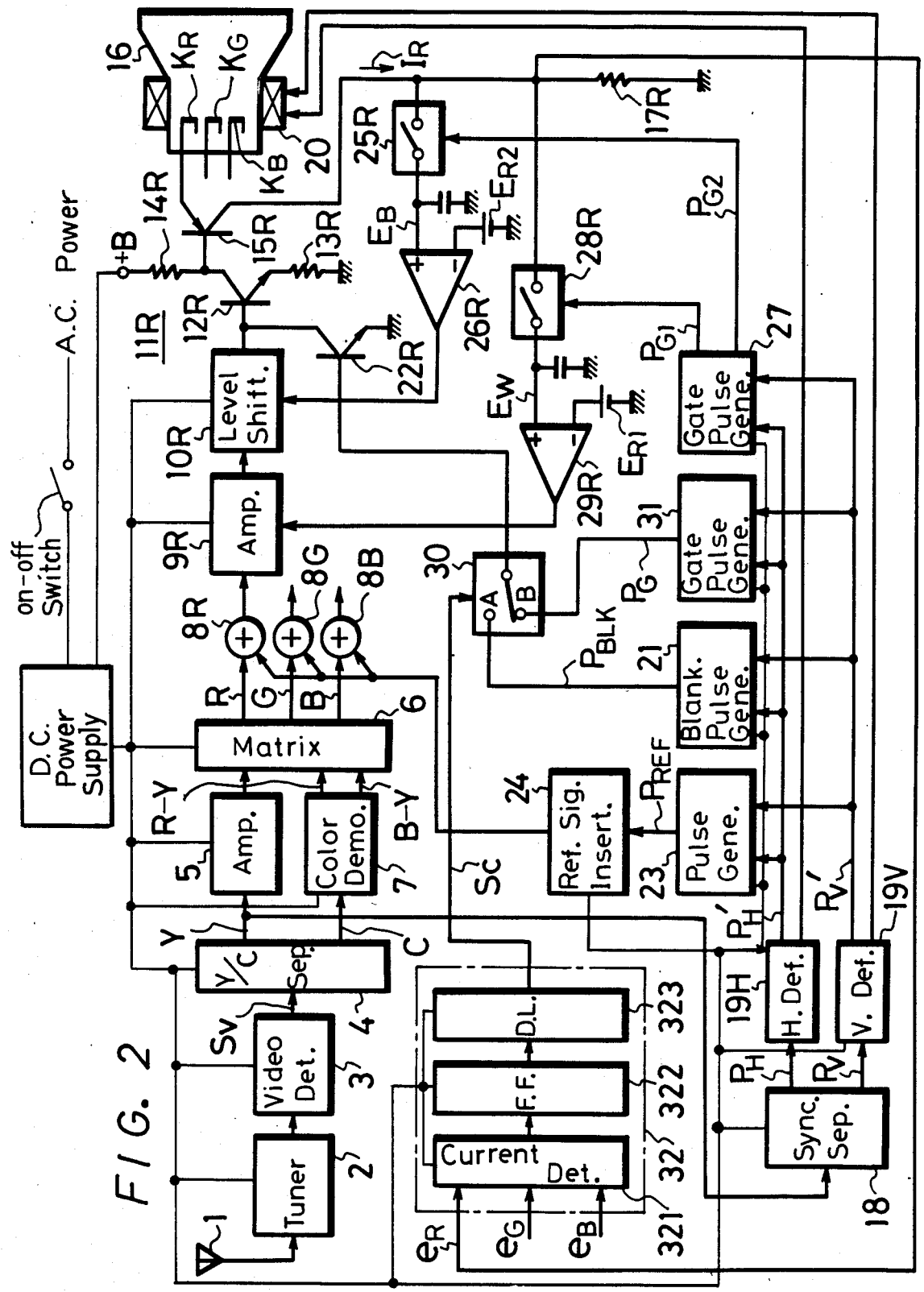
FIG. 2 is a block diagram of the invention.

An embodiment of the present invention is illustrated in FIG. 2. In FIG. 2, those parts which correspond to those in FIG. 1 are identified with the same references and will not be described in detail.

Figure 4A:
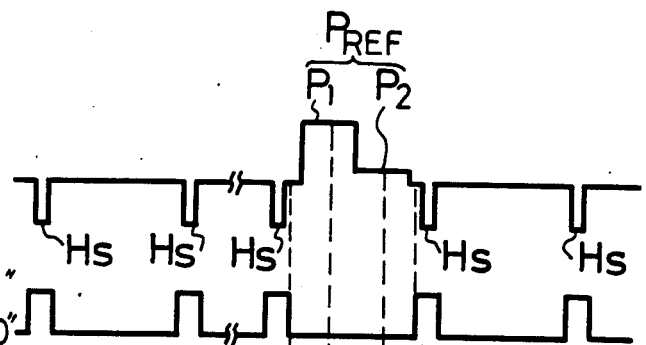

As shown in FIG. 2, the blanking pulse $P_{BLK}$ from the blanking pulse generator circuit 21 is supplied to a fixed terminal A of the switching circuit 30. A gate pulse generator circuit 31 which is supplied with the signals $P_H'$ and $P_V'$ from the deflection circuits 19H and 19G produces a gate pulse $P_G$ illustrated in FIG. 4E which has a low level "0" only during the period of the reference pulse $P_{REF}$ the pulse generator circuit 23. The gate pulse $P_G$ is supplied to a fixed terminal B of the switching circuit 30. The signal delivered from the switching circuit 30 is fed to the base of the transistor 22R.

The switching circuit 30 is controlled by a switching control signal $S_C$ from the switching control signal generator circuit 32. The control signal $S_C$ is a signal illustrated in FIG. 5B which has a high level "1" when the power switch of the television receiver is turned on and becomes low level "0" after a predetermined time when each and every one of the cathode currents of the picture tube 16 reach a value which is higher than a predetermined value. The movable contact of the switching circuit 30 is connected to terminal A when the control signal $S_C$ has a low value "0" and the movable contact is connected to terminal B when the signal $S_C$ has a high level "1".

Figure 3:
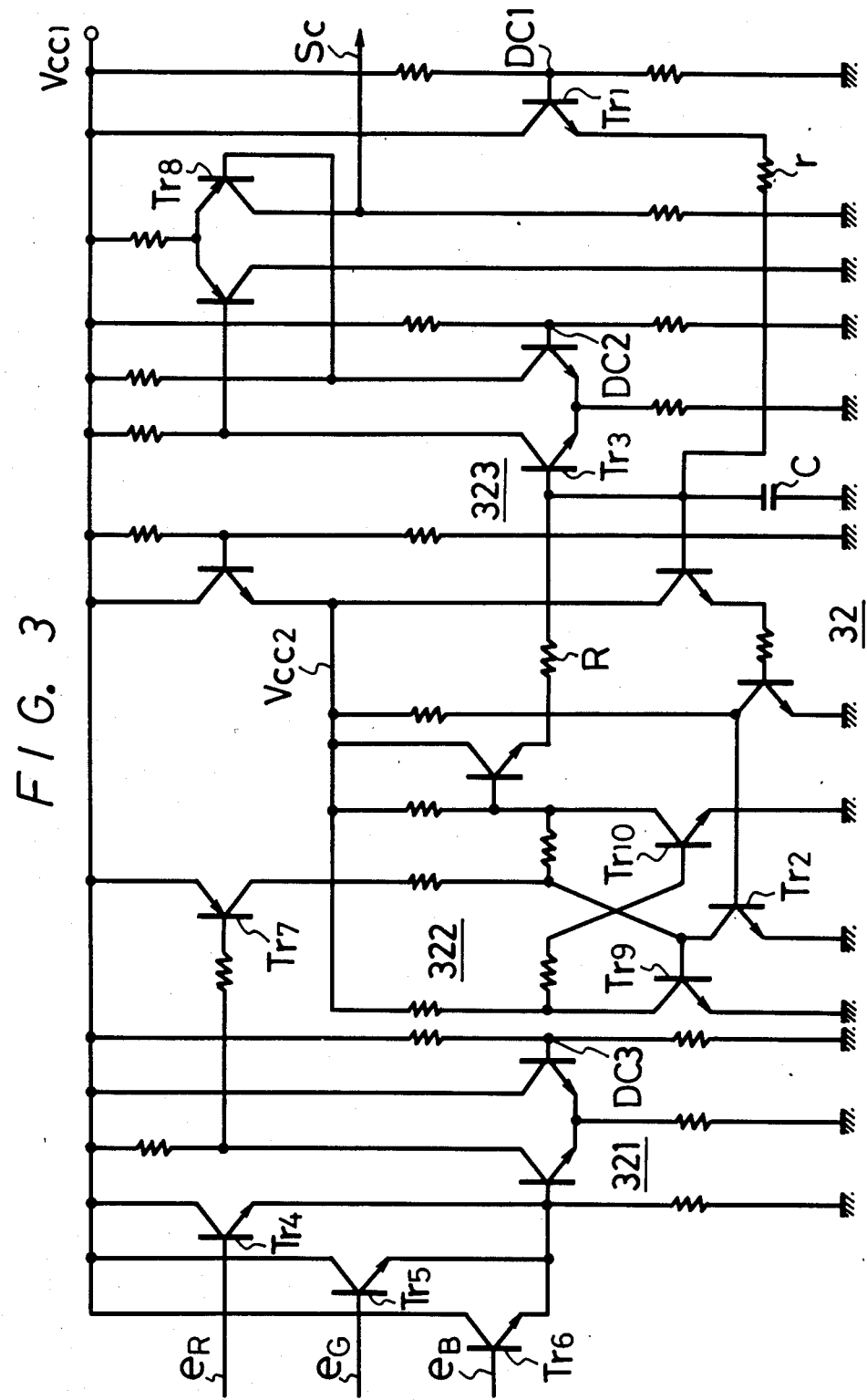
FIG. 3 is a detailed electrical schematic view of the control signal generator 32 illustrated in FIG. 2.

The control signal generator 32 comprises a current detection circuit 321, a flip-flop circuit 322 and a delay circuit 323 and is formed as illustrated in FIG. 3.

As shown in FIG. 3, a transistor $T_{r4}$ is supplied with a signal $e_R$ which is developed at the connection point between the collector of the transistor 15R and the resistor 17R illustrated in FIG. 2 and the signal $e_R$ corresponds to the magnitude of the cathode current $I_R$ corresponding to the red color.

Also, signals $e_G$ and $e_B$ corresponding respectively to the magnitude of the cathode currents for the green and blue colors are fed to transistors $T_{r5}$ and $T_{r6}$, respectively, as illustrated in FIG. 3.

At the instance the power switch of the television receiver is turned on, a voltage DC1 is supplied to a transistor $T_{r1}$ to turn this transistor on and a transistor $T_{r2}$ is turned on through a line which carries a voltage $V_{CC2}$ for a predetermined time period determined by the time constant of a resistor r and a capacitor C. Thus, when the power switch of the television receiver is turned on, the transistor $T_{r2}$ causes a flip-flop 322 to go into the reset condition such that transistors $T_{r9}$ and $T_{r10}$ are turned on and off, respectively. At that time, the base voltage of the transistor $T_{r3}$ increases to a voltage equal to $DC1-V_{BE}$ ($V_{BE}$ is the base emitter voltage of the transistor). The circuit is designed to satisfy the condition that DC2>DC1. Thus, the transistor $T_{r3}$ is made non-conductive and transistor $T_{r8}$ is made conductive. Consequently, when the power switch of the television receiver is turned on, the collector voltage of the transistor $T_{r8}$ is changed from a low level "0" to a high level "1".

Figure 5A:
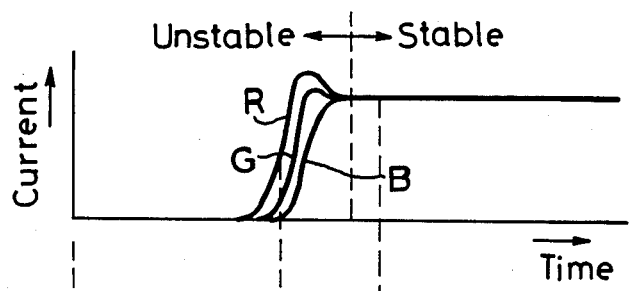

At a time $t_1$ illustrated in FIG. 5B when the cathode current begins to flow and anyone of the signals $e_R$, $e_G$ and $e_B$ become larger than a voltage DC3, a transistor $T_{r7}$ will be turned on and the flip-flop 322 will invert its state and become in a set condition where the transistor $T_{r9}$ is turned on and transistor $T_{r10}$ is turned off. At that time, the transistor $T_{r3}$ is turned on after a predetermined time from the time $t_1$ because the time constant determined by resistor R and the capacitor C and at the same time the transistor $T_{r8}$ will be turned off. Thus, the collector voltage of the transistor $T_{r8}$ will change from high level "1" to a low level "0" at a time $t_2$ from time $t_1$. The predetermined time T is selected such that the AWB circuit systems for the red, green and blue color signals are all stabilized by the time $t_2$ and the time T is selected such, for example, to be about 2-3 seconds.

Consequently, in the switching control signal generator circuit 32 illustrated in FIG. 3, the control signal $S_C$ illustrated in FIG. 5B is generated from the collector of the transistor $T_{r8}$.

In the circuit arrangement of FIG. 2, the switching circuit 30 is connected to terminal B during a period in which the control signal $S_C$ has a high level "1" or in other words, until the time $t_2$ when the AWB circuits for the red, green and blue colors are all stabilized after the power switch of the television receiver has been turned on. Therefore, during this period, the gate pulse $P_G$ from the gate pulse generator circuit 31 will be supplied to the base of the transistor 22R so that transistor 22R is turned off only during the period of the reference pulse $P_{REF}$ and is turned on during other periods. Thus, although the AWB circuits continue their operation, the video blanking is performed during that period. On the other hand, after the time $t_2$, the control signal $S_C$ will have a low level "0" so that the switching circuit 30 changes in position to the fixed terminal A. As a result, since the blanking pulse $P_{BLK}$ from the blanking pulse generator 21 is supplied to the base of the transistor 22R, the circuit of FIG. 2 can operate in the same manner as the prior art example of FIG. 1.

Though not shown, the signals from the switching circuit 30 are also supplied to the bases of the transistors which are used for video blanking for the green and blue color signal systems and the video blankings are carried out until the time $t_2$.

Thus, according to the embodiments set forth above, since the video blanking is effected until time $t_2$ when the AWB circuits for the red, green and blue primary color signals have been stabilized, it is possible to prevent an unstable picture which has color which is not maintained constant due to the instability of the AWB circuit system.

According to the present invention, as described above, since the video blanking is accomplished until the AWB circuit systems for the red, green and blue primary color signals are stabilized after the power switch of the television receiver is turned on, it is possible to prevent unstable pictures from being displayed on the picture screen and, thus, the viewer is prevented from observing undesirable pictures.

In the present invention, the blanking of the color signals after turn-on is accurately controlled because the current of the cathodes are detected and the timing is selected to be correct. Thus, correct and positive control is established.

Although the invention has been described with respect to preferred embodiments, it is not to be so limited as changes and modifications can be made which are within the full intended scope of the invention as defined by the appended claims.

We claim as our invention:

1. A color television receiver comprising; a color picture tube for displaying a color picture thereon, signal supply means including a plurality of primary color signal channels for supplying a plurality of primary color signals to said color picture tube, current detecting means connected to said signal supply means for detecting currents flowing through said color picture tube, and an automatic white balance circuit for controlling said signal supplying means in response to the detected currents of said current detecting means, comprising a power responsive circuit for generating a control signal when a power switch of the television receiver is turned on, a switching control signal generator connected to said power responsive circuit, a switching circuit connected to said switching control signal generator, a gate pulse generator which blanks except during reference signal insertion controlled by said switching circuit for inhibiting the supply of said primary color signals to said picture display means when said switch is activated, first means in said switching control signal generator connected to said power responsive circuit for activating said switching circuit when said power switch is turned on, and second means in said switching control signal generator connected to said switching circuit for disconnecting said gate pulse generator when said current flowing through said display tube exceeds a predetermined value.

2. A television receiver according to claim 1 wherein said first and second means includes a flip-flop circuit and a delay circuit having a predetermined delay time, said flip-flop circuit being triggered to one state by an output signal of said power responsive circuit and being triggered to the other state by an output signal of said current detecting means.

3. A television receiver according to claim 3 wherein said delay circuit includes an R-C time constant circuit and a level detector.

4. A color television receiver comprising, a three gun color picture tube for displaying a color picture, means for receiving and separating three color drive signals for said three gun color picture tube, a power on-off switch for supplying power to said television receiver, a switching circuit, a gate pulse generator which blanks except during reference signal insertion connected to turn-off said three color drive signals and connected to said switching circuit to deliver a blanking signal, current detecting means connected to said three gun color picture tube to detect current therein, a switching control signal generator connected to said current detecting means and supplying a control signal to said switching circuit and producing a blanking command signal for a time after said power switch has been turned on and producing a blanking off signal when the power switch has been turned on for a time sufficient such that said current detecting means detects a sufficient level of current in any of the three guns of said color picture tube.

5. A color television picture tube according to claim 4 wherein said switching control signal generator includes a flip-flop which is controlled to change condition by a composite signal from all three guns from said current detecting means.

* * * * *